Oct. 7, 1969  R. C. McCALL  3,471,699
PHOSPHOR-POLYTETRAFLUOROETHYLENE THERMOLUMINESCENT DOSIMETER
Filed Jan. 13, 1966
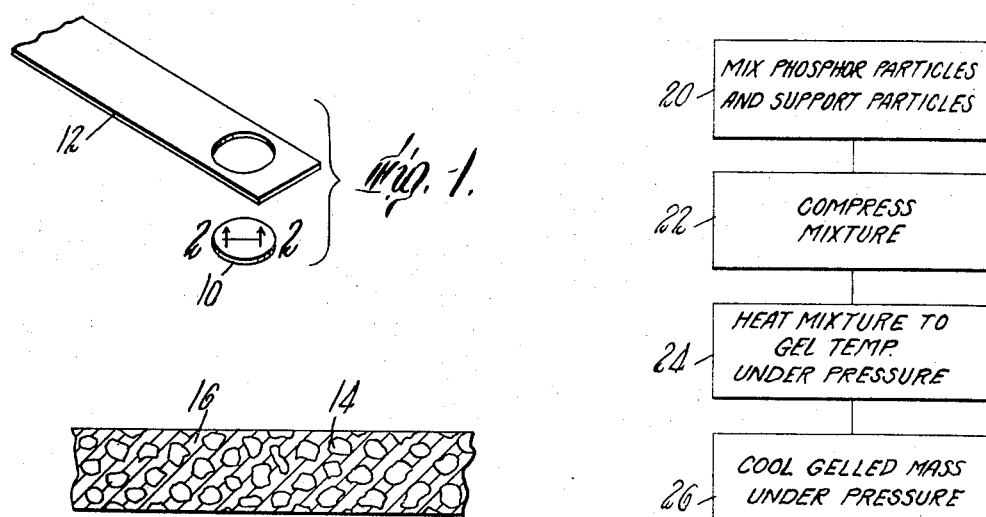
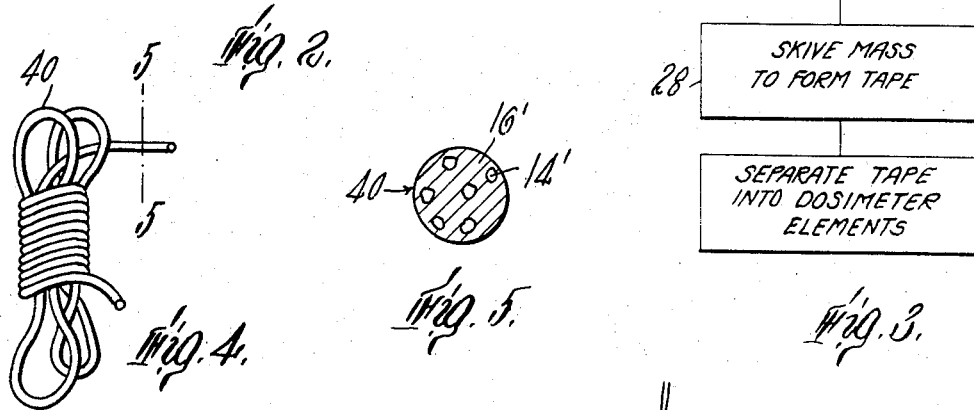
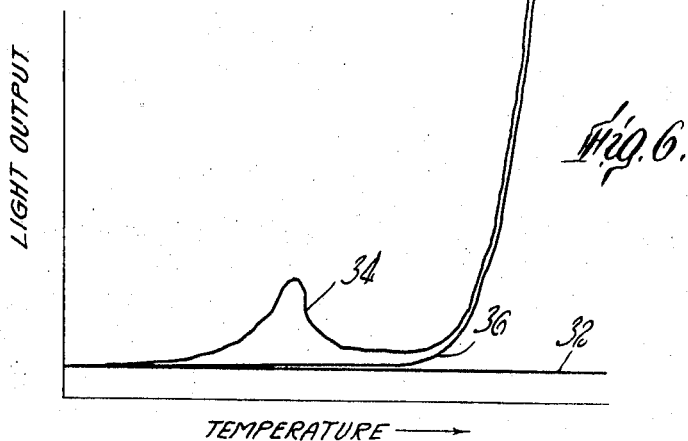

United States Patent Office 3,471,699
Patented Oct. 7, 1969

3,471,699
PHOSPHOR-POLYTETRAFLUOROETHYLENE THERMOLUMINESCENT DOSIMETER
Richard C. McCall, Atherton, Calif., assignor, by mesne assignments, to Isotopes, Inc., Westwood, N.J., a corporation of California
Continuation-in-part of application Ser. No. 438,199, Mar. 9, 1965. This application Jan. 13, 1966, Ser. No. 520,425
Int. Cl. G01n 21/38
U.S. Cl. 250—71    4 Claims

ABSTRACT OF THE DISCLOSURE

A radiation dosimeter is described which consists of lithium fluoride phosphor particles embedded substantially uniformly throughout a polytetrafluoroethylene matrix. Also, a method is described for making the dosimeter which consists of thoroughly mixing the lithium fluoride particles with polytetrafluoroethylene particles, compressing the mixture by a factor from 5:1 to 8:1, heating the mixture to a gelling temperature of 350° C. at a rate of 50° C. per hour per half inch of mixture thickness and maintaining the terminal temperature for one hour per half inch of mixture thickness, and cooling the gelled mass at a rate substantially the opposite of the heating rate.

---

This application is a continuation-in-part of my copending patent application, Ser. No. 438,199 filed Mar. 9, 1965, now abandoned.

This invention relates to radiation dosimetry and, more particularly, to dosimeters of the thermoluminescent type.

Certain well-known crystalline substances, such as quartz, after exposure to ionizing radiation give off light when they are heated. This release of light, or luminescence, is caused by the thermal release of electrons from positions of "metastability" for return to the ground state. A thermoluminescent material of exceptionally good radiation response is lithium fluoride. That material, when exposed to ionizing radiation dosages in the order of a few milliroentgens (mr.), will release detectable amounts of photon radiation and is particularly useful in radiation dosimetry.

In a typical thermoluminescent dosimetry device, thermoluminescent phosphor is disposed in a manner that enables the device to have a uniform response to different types of ionizing radiation, and successive radiation dosage measurements utilizing such devices to have a reproducible uniformity. Typically, such uniformity is obtained by employing high quality phosphor material of relatively small particle size. That phosphor material frequently is rigidly and accurately supported for exposure to ionizing radiation and for readout with a view to obtaining reproducible results. Heretofore, the phosphor has been secured in a container, such as one that may be hermetically sealed, or adhesively secured by means of a binder to a resistance heating element. Such support or container should have minimum adverse effect on the radiation dosage response of the phosphor. After exposure to radiation, the phosphor must be heated for readout. Where the phosphor is removed from the container for readout, problems of handling and possible contamination result. Should the phosphor not be removed from the container or support, that structure must be capable of withstanding the temperature to which the phosphor is heated for readout purposes (typically in excess of 250° C.); and not interfere with the light release of the phosphor during readout by producing light itself, for example. Heretofore such dosimeters have been expensive, cumbersome and inefficient in varying degrees.

It is an object of this invention to provide a novel and improved radiation dosimeter of the thermoluminescent type.

Another object of the invention is to provide a novel and improved method of manufacturing a thermoluminescent dosimeter.

Another object of this invention is to provide a dosimeter of the thermoluminescent type that includes a novel and improved support structure from which the phosphor need not be removed during readout.

Another object of the invention is to provide a novel and improved thermoluminescent dosimeter in which interfering luminescent effects such as triboluminescence, chemiluminescence and luminescence induced by static electricity are significantly reduced.

A further object of the invention is to improve the heat transfer and optical characteristics of a thermoluminescent dosimeter.

Still another object of the invention is to provide a novel and improved thermoluminescent dosimeter configuration which is characterized by chemical inertness and mechanical strength so that it is particularly useful in in vivo dosimetry; and that is capable of being formed in solid, flexible geometries of unusual configurations.

Still another object of the invention is to provide a novel and improved thermoluminescent dosimeter which is relatively inexpensive to manufacture and is convenient and accurate for use in radiation dosage measurements.

In accordance with the invention, there is provided a dosimeter consisting essentially of thermoluminescent phosphor in the form of finely divided particles substantially uniformly dispersed throughout a chemically inert and translucent mechanical support structure. The support structure may be formed by a variety of processing techniques such as molding or extrusion. A particular form of this dosimeter structure is a sheet element of uniform thickness in which the weight of the support material is approximately twice that of the phosphor material. That dosimeter is manufactured by thoroughly mixing phosphor particles and support material particles in a desired ratio; heating the mixture to the gelling temperature of the support material in a controlled manner under pressure as in a molding operation and then cooling the resultant product also in a controlled manner to form a solid mass. This resulting mass is then fabricated into dosimeter devices of uniform thickness typically in the range of 0.13-0.5 millimeter. A second useful form of dosimeter manufactured according to the invention is an extruded flexible fiber form of uniform cross-sectional configuration. Dosimeter elements may be cut to a desired length from the fiber element.

The resulting dosimeter device contains a uniform amount of phosphor powder which is mechanically secured and distributed uniformly throughout the support material. The preferred support material—polytetrafluoroethylene—sold under the trademark Teflon—has a relatively low atomic number so that it has substantially no adverse effect on the phosphor response to radiation. In addition, this support material, in thin sheets, is translucent to light emitted by the phosphor and has substantially the same refractive index as lithium fluoride and, therefore, substantially all light produced by the phosphor during thermal readout is transmitted externally of the device for sensing in conventional manner. Further, this material is chemically inert (it does not react with either the surrounding atmosphere or with the phosphor), withstands temperatures in excess of that required for readout of lithium fluoride phosphors, and is not itself thermoluminescent. The device enhances phosphor characteristics with the advantages of particular structural configurations, produces useful radiation dose information in the milliroentgen $-10^5$ R range, and is particularly convenient to handle both in radiation exposure and in dose readout.

Other objects, features, and advantages of the invention will be seen as the following description of a particular embodiment thereof progresses, in conjunction with the drawing, in which:

FIGURE 1 is a perspective view of a tape manufactured in accordance with the invention and a disk dosimeter punched from the tape;

FIGURE 2 is a sectional view of the disk dosimeter taken along the line 2—2 of FIGURE 1;

FIGURE 3 is a flow diagram indicating a sequence for manufacturing the dosimeters;

FIGURE 4 is a perspective view of a second form of dosimeter constructed in accordance with the invention;

FIGURE 5 is a sectional view taken along the line 5—5 of FIGURE 4; and

FIGURE 6 is a graph indicating readout characteristics of a dosimeter constructed in accordance with the invention.

A form of dosimeter constructed in accordance with the invention is indicated in FIGURES 1 and 2. As there indicated, the dosimeter is a disk 10 about one-half inch in diameter and 0.25 millimeter in thickness. The disk is punched from a tape 12. As indicated in the diagrammatic sectional view of FIGURE 2, this dosimeter consists of a multiplicity of phosphor particles 14 substantially uniformly dispersed throughout the support material 16.

The posphor particles 14 are of thermoluminescent grade lithium fluoride, and each particle has a maximum dimension in the order of three mils (all phosphor particles being capable of passing through a 200 mesh screen). These particles are separated from one another by the support material 16 which in the preferred embodiment is polytetrafluoroethylene, which mechanically supports the phosphor particles but does not react chemically with them.

The series of steps for manufacturing the dosimeter material is indicated diagrammatically in FIGURE 3. Initially the polytetrafluoroethylene has been ground to a suitable particle size. In the case of Teflon-7, the particle size is approximately 35 microns. The two types of particles are thoroughly blended (as indicated by block 20) by weight ratio up to one-half as much phosphor material 14 as support material 16—a loading of 33%. (The mechanical strength of the resulting product tends to deteriorate where loadings substantially in excess of this percentage have been employed.) This mixture is compressed by a factor of 5/1–8/1 (block 22) and then heated in air to the gelling (sintering) temperature of the support material 16 (to a temperature in the order of 350° C.) (block 24).

During heating, a pressure in the range of 8,000–10,000 p.s.i. typically is maintained on the mixture. The heating operation is carefully controlled so that the rate of temperature increase is gradual—50° C. per hour per half-inch of wall thickness being satisfactory—and then held at the terminal temperature (350° C.) for one hour per half-inch of wall thickness. The resulting gelled mass in which the polytetrafluoroethylene molecules have tended to line up around the phosphor particles is then slowly cooled back to room temperature (block 26) at a rate that typically is substantially the same as the heating rate. The resulting product is an amorphous form of support material 16 formed around each particle 14 of the phosphor but without any chemical bonding between the support material and the phosphor particles.

The cooled solid mass is then skived (block 28) to produce the tape 12 of uniform thickness which in this particular embodiment is ten mils in thickness. A thinner tape may be generated (e.g.—a six mil tape). In other configurations, the mass may be formed in bar or sheet configuration and the dosimeter elements separated therefrom by cutting. The thin sheet form is particularly useful as no phosphor particles are exposed at the surface of the sheet.

A second dosimeter configuration is illustrated in FIG. 4. That form is a flexible fiber 40, a typical diameter of which is one millimeter and which may be formed in fifty centimeter lengths by an extrusion process. A suitable extrusion process utilizes Teflon-6 powder, the particles of which are a few microns in dimension with an extrusion aid oil such as naphtha as a lubricant. The lubricant and the LiF phosphor particles are added to the powder slowly in a blending operation, the phosphor loading being about eight percent. When blending is complete, a charge is pressed from the mixture that will fit the cavity of the extruder. The charge is then forced through a die in a press similar to a lead press which forms the desired flexible fiber shape. The unsintered extruded fiber is then passed through a vertical oven, the top half being kept below sintering temperature (500° F.) to dry off the lubricant. Sintering is accomplished in the lower half of the oven which is maintained at approximately 700° F.

The sintered flexible fiber has phosphor particles distributed throughout the fiber, each particle being at least thinly covered by a protective, air excluding layer of Teflon. The fiber may be cut into lengths as short as two millimeters, either before or after exposure to radiation. This flexible fiber configuration is particularly useful where small detector size is essential and in in vivo measurements.

The dosimeter disk 10 in the form shown in FIGURES 1 and 2 is exposed to radiation of interest for a radiation dose measurement. After exposure, the dosimeter may be read out utilizing the equipment disclosed in Patent No. 3,176,133, issued Mar. 30, 1965, in the name of R. C. McCall and W. H. Barr and entitled Reading Apparatus for Thermoluminescent Type Radiation Dosimeters. In the readout operation, the dosimeter disk is placed in the circular depression of a support element (planchet) which functions as a resistance heating element and inserted into the readout chamber so that the support element is connected in a high amperage electrical circuit. The application of electrical energy to the support element may be controlled so that the support element does not continually increase in temperature throughout the heating cycle but rather upon reaching a desired temperature is maintained at that temperature. Eleven seconds is a typical duration of the heating cycle for this dosimeter.

FIGURE 6 illustrates glow curve measurements on a dosimeter constructed in accordance with the invention utilizing thermoluminescent grade lithium fluoride with a dosimeter loading of 23%. Curve 32 represents the photomultiplier dark current output; curve 34 is a glow curve of a dosimeter that has been exposed to a radiation dosage of one hundred mr.; and curve 36 resulted from a second readout cycle on the same dosimeter (after the readout indicated by curve 34). These data indicate a background signal under the glow curve of about 60% of the total signal and the background itself is composed of approximately 90% photomultiplier dark current and 10% due to phosphor background.

Improved dosimeter results can be achieved through increased loading of the dosimeter and with the use of higher grade phosphor. The dosimeters of the invention are particularly useful in radiological dosimetry, especially in high energy X-ray, gamma or electron beam therapy.

While particular embodiments of the invention have been shown and described, various modifications thereof will be obvious to those skilled in the art. For example, other thermoluminescent phosphors such as activated calcium fluoride and lithium borate and other support materials such as silicone rubbers may be used in particular combinations in the practice of the invention. Therefore, it is not intended that the invention be limited to the disclosed embodiments or to details thereof and departures may be made therefrom within the spirit and scope of the invention as defined in the claims.

What is claimed is:

1. A radiation dosimeter comprising thermoluminescent phosphor particles having a maximum dimension of approximately three mils embedded substantially uniformly throughout a continuous solid shape-retaining translucent support which does not chemically react with the phosphor, the weight ratio of said phosphor particles to said support being not more than approximately 1:2.

2. The dosimeter of claim 1 wherein the phosphor particles are lithium fluoride.

3. The dosimeter of claim 1 wherein said support is polytetrafluoroethylene.

4. The dosimeter of claim 1 wherein the support has a uniform thickness of not more than ten mils.

References Cited

UNITED STATES PATENTS

| 2,714,304 | 8/1955 | Dedda | 250—71 X |
| 3,255,350 | 6/1966 | Fix | 250—83 |

ARCHIE R. BORCHELT, Primary Examiner

U.S. Cl. X.R.

250—83; 252—301.4